United States Patent [19]

Aghajanian et al.

[11] Patent Number: 5,316,069

[45] Date of Patent: May 31, 1994

[54] METHOD OF MAKING METAL MATRIX COMPOSITE BODIES WITH USE OF A REACTIVE BARRIER

[75] Inventors: Michael K. Aghajanian, Bel Air, Md.; Steven D. Keck; John T. Burke, both of Hockessin, Del.; Gregory E. Hannon, North East, Md.; Kurt J. Becker, Newark, Del.; Steven J. Taylor, Middletown, Del.; Robert J. Wiener, Newark, Del.; Allyn L. McCormick, Bear, Del.

[73] Assignee: Lanxide Technology Company, LP, Newark, Del.

[21] Appl. No.: 803,769

[22] Filed: Dec. 5, 1991

Related U.S. Application Data

[63] Continuation of Ser. No. 520,915, May 9, 1990, abandoned.

[51] Int. Cl.$^5$ ............................................. B22D 19/02
[52] U.S. Cl. ........................................ 164/97; 164/100; 164/101
[58] Field of Search .................. 164/91, 97, 98, 100, 164/101, 102, 103, 104, 105

[56] References Cited

U.S. PATENT DOCUMENTS

| | | | |
|---|---|---|---|
| 2,851,354 | 9/1958 | Scanlan et al. | 75/222 |
| 3,031,340 | 4/1962 | Girardot | 117/118 |
| 3,149,409 | 9/1964 | Maruhn | 29/156.5 |
| 3,364,976 | 1/1968 | Reding et al. | 164/63 |
| 3,396,777 | 8/1968 | Reding, Jr. | 164/97 |
| 3,547,180 | 12/1970 | Cochran et al. | 164/61 |
| 3,608,170 | 9/1971 | Larson et al. | 29/149.5 |
| 3,718,441 | 2/1973 | Landingham | 29/182.1 |
| 3,864,154 | 2/1975 | Gazza et al. | 29/123 B |
| 3,868,267 | 2/1975 | Gazza et al. | 117/22 |
| 3,915,699 | 10/1975 | Umehara et al. | 75/208 R |
| 3,969,553 | 7/1976 | Kondo et al. | 427/299 |
| 3,970,136 | 7/1976 | Cannell et al. | 164/108 |
| 4,082,864 | 4/1978 | Kendall et al. | 427/248 |
| 4,232,091 | 11/1980 | Grimshaw et al. | 428/472 |
| 4,376,803 | 3/1983 | Katzman | 428/408 |
| 4,376,804 | 3/1983 | Katzman | 428/408 |
| 4,450,207 | 5/1984 | Donomoto et al. | 428/614 |
| 4,473,103 | 9/1984 | Kenney et al. | 164/97 |
| 4,559,246 | 12/1985 | Jones | 427/299 |

(List continued on next page.)

FOREIGN PATENT DOCUMENTS

| | | |
|---|---|---|
| 0071449 | 2/1983 | European Pat. Off. |
| 0094353 | 11/1983 | European Pat. Off. |
| 0115742 | 8/1984 | European Pat. Off. |
| 0245193 | 11/1987 | European Pat. Off. |
| 0323945 | 7/1989 | European Pat. Off. |
| 0340957 | 11/1989 | European Pat. Off. |
| 0364963 | 4/1990 | European Pat. Off. |
| 2819076 | 10/1979 | Fed. Rep. of Germany |
| 0144441 | 8/1983 | Japan |
| 2156718 | 10/1985 | United Kingdom ......... 164/102 |

OTHER PUBLICATIONS

F. Delannay, L. Froyen, and A. Deruyttere, "Review: The Wetting of Solids by Molten Metals and its Relation to the Preparation of Metal-Matrix Composites", Journal of Materials Science, vol. 22, No. 1, pp. 1-16, Jan. 1987.

(List continued on next page.)

*Primary Examiner*—Paula A. Bradley
*Assistant Examiner*—Rex E. Pelto
*Attorney, Agent, or Firm*—Mark G. Mortenson; Jeffrey R. Ramberg

[57] ABSTRACT

The present invention relates to a novel process for forming metal matrix composite bodies by using a reactive barrier material. Particularly, an infiltration enhancer or an infiltration enhancer precursor or an infiltrating atmosphere are in communication with a filler material or a preform, at least at some point during the process, which permits molten matrix metal to spontaneously infiltrate the filler material or preform up to the reactive barrier material. Such spontaneous infiltration occurs without the requirement for the application of any pressure or vacuum. Accordingly, shaped metal matrix composite bodies can be produced having superior surface finish.

29 Claims, 1 Drawing Sheet

U.S. PATENT DOCUMENTS

| | | | |
|---|---|---|---|
| 4,570,316 | 2/1986 | Sakamaki et al. | 29/156.8 R |
| 4,630,665 | 12/1986 | Novak et al. | 164/97 |
| 4,657,065 | 4/1987 | Wada et al. | 164/461 |
| 4,662,429 | 5/1987 | Wada et al. | 164/461 |
| 4,673,435 | 6/1987 | Yamaguchi et al. | 75/235 |
| 4,713,111 | 12/1987 | Cameron et al. | 75/68 R |
| 4,753,690 | 6/1988 | Wada et al. | 148/11.5 A |
| 4,777,097 | 10/1988 | Kubo et al. | 428/614 |
| 4,802,524 | 2/1989 | Donomoto | 164/97 |
| 4,828,008 | 5/1989 | White et al. | 164/66.1 |
| 4,871,008 | 10/1989 | Dwivedi | 164/100 |
| 4,873,038 | 10/1989 | Rapp | 264/65 |
| 4,923,832 | 5/1990 | Newkirk | 501/119 |
| 4,932,099 | 6/1990 | Corwin | 164/97 |
| 4,935,055 | 6/1990 | Aghajanian | 164/107 |
| 5,007,475 | 1/1991 | Kennedy | 164/97 |
| 5,007,476 | 4/1991 | Newkirk | 164/97 |

OTHER PUBLICATIONS

G. R. Edwards and D. L. Olson, "The Infiltration Kinetics of Aluminum in Silicon Carbide Compacts", Annual Report from Center for Welding Research, Colorado School of Mines, under ONR Contract No. M00014-85-K-0451, DTIC Report AD-A184 682, Jul. 1987.

A. Mortensen, M. N. Gungor, J. A. Cornie, and M. C. Flemings "Alloy Microstructures in Cast Metal Matrix Composites", Journal of Metals, vol. 38, No. 3, pp. 30–35, Mar. 1986.

A. Mortensen, J. A. Cornie, and M. C. Flemings, "Solidification Processing of Metal-Matrix Composites", Journal of Metals, vol. 40, No. 2, pp. 12–19, Feb. 1988.

B. D. Sparks and F. W. Meadus, "The Development of an Infiltrated Lead/Iron Composite Material for use as a Non-toxic Bird Shot", Composites, pp. 37–39, Jan. 1978.

International Search Report for International patent application Ser. No. PCT/US91/03232 (see attached Search Report).

METHOD OF MAKING METAL MATRIX COMPOSITE BODIES WITH USE OF A REACTIVE BARRIER

This is a continuation of copending application Ser. No. 520,915 filed on May 9, 1990 now abandoned.

FIELD OF THE INVENTION

The present invention relates to a novel process for forming metal matrix composite bodies by using a barrier material. Particularly, an infiltration enhancer and/or an infiltration enhancer precursor and/or an infiltrating atmosphere are in communication with a filler material or a preform, at least at some point during the process, which permits molten matrix metal to spontaneously infiltrate the filler material or preform up to the barrier material. Such spontaneous infiltration occurs without the requirement for the application of any pressure or vacuum. Accordingly, shaped metal matrix composite bodies can be produced having superior surface finish.

BACKGROUND OF THE INVENTION

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, coefficient of thermal expansion (C.T.E.), density, thermal conductivity and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher specific stiffness (e.g., elastic modulus over density), wear resistance, thermal conductivity, low coefficient of thermal expansion (C.T.E.) and high temperature strength and/or specific strength (e.g., strength over density) relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968 to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such is a ceramic material. Moreover, there has been a long felt need to minimize the amount of final machining operations needed to produce a metal matrix composite body. The present invention satisfies these needs by providing a spontaneous infiltration mechanism for infiltrating a material (e.g., a ceramic material), which can be formed into a preform with molten matrix metal (e.g., aluminum), up to an applied barrier material in the presence of an infiltrating atmosphere (e.g., nitrogen) under normal atmospheric pressures so long as an infiltration enhancer precursor and/or infiltration enhancer is present at least at some point during the process.

DESCRIPTION OF COMMONLY OWNED U.S. PATENT APPLICATIONS

The subject matter of this application is related to that of several other copending and co-owned patent applications and issued Patents. Particularly, these other copending patent applications and issued Patents describe novel methods for making metal matrix composite materials (hereinafter sometimes referred to as "Commonly Owned Metal Matrix Patent Applications").

A novel method of making a metal matrix composite material is disclosed in Commonly ned U.S. patent application Ser. No. 07/049,171, filed May 13, 1987, in the names of White et al., and entitled "Metal Matrix Composites", now U.S. Pat. No. 4,828,008, which issued on May 9, 1989, and which published in the EPO on Nov. 17, 1988, as Publication No. 0291441. According to the method of this White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. Pat. No. 4,935,055, which issued on Jun. 19, 1990, from U.S. patent application Ser. No. 07/141,642, filed Jan. 7, 1988, in the names of Michael K. Aghaianian et al., and entitled "Method of Making Metal Matrix Composite with the Use of a Barrier" and which published in the EPO on Jul. 12, 1989, as Publication No. 0323945. According to the method of this Aghajanian et al. invention, a barrier means (e.g., particulate titanium diboride or a graphite material such as a flexible graphite foil product sold by Union Carbide under the trade name Grafoil®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned and Copending U.S. patent application Ser. No. 07/517,541, filed on Apr. 24, 1990, which was a continuation of U.S. patent application Ser. No. 07/168,284, filed Mar. 15, 1988 (and now abandoned), in the names of Michael K. Aghajanian and Marc S. Newkirk and entitled "Metal Matrix Composites and Techniques for Making the Same", and which published in the EPO on Sep. 20, 1989, as Publication No. 0333629. In accordance with the methods disclosed in this U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. patent application Ser. No. 07/521,043, filed May 9, 1990, which was a continuation-in-part of U.S. patent application Ser. No. 07/484,753, filed Feb. 23, 1990, which was a continuation-in-part of U.S. patent application Ser. No. 07/432,661, filed Nov. 7, 1989 (and now abandoned), which was a continuation-in-part of U.S. patent application Ser. No. 07/416,327, filed Oct. 6, 1989 (and now abandoned), which was a continuation-in-part application of U.S. patent application Ser. No. 07/349,590, filed May 9, 1989, which in turn was a continuation-in-part application of U.S. patent application Ser. No. 07/269,311, filed Nov. 10, 1988 (and now abandoned) all of which were filed in the names of Michael K. Aghajanian et al. and all of which are entitled "A Method of Forming Metal Matrix Composite Bodies By A Spontaneous Infiltration Process, and Products Produced Therefrom." According to these Aghajanian et al. applications, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/infiltration enhancer precursor/infiltrating atmosphere systems which exhibit spontaneous infiltration. Specifically, Aghajanian et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian et al. applications that the spontaneous infiltration behavior should occur in other matrix metal/infiltration enhancer precursor/infiltrating atmosphere systems.

Each of the above-discussed Commonly Owned Metal Matrix Patent Applications describes methods for the production of metal matrix composite bodies and novel metal matrix composite bodies which are produced therefrom. The entire disclosures of all of the foregoing Commonly Owned Metal Matrix Patent Applications are expressly incorporated herein by reference.

SUMMARY OF THE INVENTION

A metal matrix composite body is produced by spontaneously infiltrating a molten matrix metal into a permeable mass of filler material or a preform having at least one surface boundary established or defined by a barrier means. Specifically, an infiltration enhancer and/or an infiltration enhancer precursor and/or an infiltrating atmosphere are in communication with the filler material or preform, at least at some point during the process, which permits molten matrix metal to spontaneously infiltrate the filler material or preform up to the barrier material. A barrier material, typically, inhibits the transport of molten matrix metal beyond itself, thereby permitting the formation of shaped metal matrix composite bodies.

The barrier material of the instant invention may be a physical barrier, a reactive barrier, or any combination of the two. The barrier material should prevent the molten matrix metal from infiltrating beyond the desired boundaries of the filler material or preform and, preferably, provide a smooth surface finish to the final metal matrix composite body. Further, the barrier should not react or dissolve into the molten matrix metal or the filler material, unless such behavior is desired, e.g., when a reactive barrier is utilized. Any material or combination of materials which satisfy the above-described criteria for a particular matrix metal/infiltration enhancer and/or infiltration enhancer precursor and/or infiltrating atmosphere/filler material system may be utilized as a barrier material in that system.

To obtain spontaneous infiltration, a precursor to an infiltration enhancer may be supplied to at least one of a filler material or preform, and/or a matrix metal and/or an infiltrating atmosphere. The supplied infiltration enhancer precursor may thereafter react with at least one of the filler material or preform and/or the matrix metal and/or the infiltrating atmosphere to produce infiltration enhancer in at least a portion of, or on, the filler material or preform. Ultimately, at least during the spontaneous infiltration, infiltration enhancer should be in contact with at least a portion of the filler material or preform.

In another preferred embodiment of the invention, rather than supplying an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be in contact with at least a portion of the filler material or preform.

This application discusses various examples of matrix metals, which at some point during the formation of a metal matrix composite, are contacted with an infiltration enhancer precursor, in the presence of an infiltrating atmosphere. Thus, various references will be made to particular matrix metal/infiltration enhancer precursor/infiltrating atmosphere systems which exhibit spontaneous infiltration. However, it is conceivable that many other matrix metal/infiltration enhancer precursor/infiltrating atmosphere systems other than those discussed in this application may behave in a manner similar to the systems discussed above herein. Specifically, spontaneous infiltration behavior has been observed in the aluminum/magnesium/nitrogen system; the aluminum/strontium/nitrogen system; the aluminum/zinc/oxygen system; and the aluminum/calcium/nitrogen system. Accordingly, even though this application discusses only those systems referred to above herein (with particular emphasis being placed upon the aluminum/magnesium/nitrogen system), it should be understood that other matrix metal/infiltration enhancer precursor/infiltrating atmosphere systems may behave in a similar manner.

In a preferred embodiment for achieving spontaneous infiltration into a permeable mass of filler material or a preform, molten matrix metal is contacted with the preform or filler material. The preform or filler material may have admixed therewith, and/or at some point during the process, be exposed to, an infiltration enhancer precursor. Moreover, in a preferred embodiment, the molten matrix metal and/or preform or filler material communicate with an infiltrating atmosphere for at least a portion of the process. In another preferred embodiment, the matrix metal and/or preform or filler material communicate with an infiltrating atmosphere for substantially all of the process. The preform or filler material will be spontaneously infiltrated by molten matrix metal, and the extent or rate of spontaneous infiltration and formation of metal matrix composite material will vary with a given set of processing conditions including, for example, the concentration of infiltration enhancer precursor provided to the system (e.g., in the molten matrix alloy and/or in the filler material or preform and/or in the infiltrating atmosphere), the size and/or composition of the filler material, the size and/or composition of particles in the preform, the available porosity for infiltration into the preform or filler material, the time permitted for infiltration to occur, and/or the temperature at which infiltration occurs. Spontaneous infiltration typically occurs to an extent sufficient to embed substantially completely the preform or filler material.

Moreover, by varying the composition of the matrix metal and/or the processing conditions, the physical and mechanical properties of the formed metal matrix composite bodies may be engineered to any particular application or need. Further, by subjecting a formed metal matrix composite body to a post treatment process (e.g., directional solidification, heat treatment, etc.) the mechanical and/or physical properties may be further engineered to meet any particular application or need. Still further, by controlling the processing conditions during the formation of a metal matrix composite the nitrogen content of the formed metal matrix composite may be tailored to meet a wide range of industrial applications.

Moreover, by controlling the composition and/or size (e.g., particle diameter) and/or geometry of the filler material or the material comprising the preform, the physical and/or mechanical properties of the formed metal matrix composite can be controlled or engineered to meet any number of industrial needs. For example, it has been discovered that wear resistance of the metal matrix composite can be increased by increasing the size of the filler material (e.g., increasing the average diameter of the filler material particles), given that the wear resistance of filler material is higher than that of the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler material, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, alone or in combination, a metal matrix composite can be engineered to contain a desired combination of properties.

DEFINITIONS

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "Barrier Means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered nonfunctional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal, etc.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially non-reactive with and/or of limited solubility in the matrix metal and may be single or multiphase. Fillers may be provided in a wide variety of forms and sizes, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Hot-Topping", as used herein, refers to the placement of a substance on one end (the "topping" end) of an at least partially formed metal matrix composite body which reacts exothermically with at least one of the matrix metal and/or filler material and/or with another material supplied to the topping end. This exothermic reaction should provide sufficient heat to maintain the matrix metal at the topping end in a molten state while the balance of the matrix metal in the composite cools to solidification temperature.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from, for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform or filler material. It should be understood that whenever a "/" appears between an exemplary matrix metal, infiltration enhancer precursor and infiltrating atmosphere that the "/" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or a filler material or preform in a manner which would be significantly detrimental to the spontaneous infiltration mechanism. The nonreactive vessel may be disposable and removable after the spontaneous infiltration of the molten matrix metal has been completed.

"Physical Barrier", as used herein, is any barrier which is not a reactive barrier.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reactive Barrier", as used herein, means a barrier which reacts with at least one of the molten matrix metal, the filler material, the infiltration enhancer, the infiltration enhancer precursor, or the infiltrating atmosphere to either provide or remove a substance from the spontaneous infiltration system thereby interferring, inhibiting, preventing, or terminating, the migration, movement, or the like, of molten matrix metal beyond a surface boundary of a permeable mass of filler material or preform, where such surface boundary is defined by said reactive barrier. For example, the reactive barrier could react with the molten matrix metal upon contact with the molten matrix metal to form a compound which interferes, inhibits, prevents, or terminates the migration, movement, or the like, of the molten matrix metal; or alternatively, the reactive barrier could locally react with the infiltration enhancer or infiltration enhancer precursor resulting in the removal of the infiltration enhancer or infiltration enhancer precursor from the immediate vicinity of the reactive barrier which in turn interferes, inhibits, prevents, or terminates the migration, movement, or the like, of molten matrix metal beyond the area from which the infiltration enhancer precursorcer infiltration enhancer has been removed.

The reactive barrier should react with at least one of the molten matrix metal, infiltration enhancer precursor, infiltration enhancer, filler material or infiltrating atmosphere, at a rate which is sufficient to prevent the molten matrix metal from migrating or infiltrating to a significant (or undesirable) extent beyond the desired boundaries of the filler material or preform. Therefore, a material will qualify as a reactive barrier only if the kinetics of reaction between the material and at least one of the molten matrix metal, infiltration enhancer, infiltration enhancer precursor, filler material, or infiltrating atmosphere is sufficiently rapid to prevent any significant (or undesirable) infiltration or migration of the molten matrix metal beyond the desired boundaries of the filler material or preform.

A material which functions as a barrier material and reacts with at least one of the molten parent metal, infiltration enhancer, infiltration enhancer precursor, filler material, or infiltrating atmosphere, to produce or remove a substance from the spontaneous infiltration system which results in the interference, inhibition, prevention, or termination of the migration, movement, or the like, of molten matrix metal, is not necessarily a reactive barrier. For example, the barrier may be functioning as a physical barrier because the kinetics of reaction between the material and at least one of the molten matrix metal, infiltration enhancer, infiltration enhancer precursor, filler material, or infiltrating atmosphere are too slow to effectively interfere, inhibit, prevent, or terminate the migration, movement, or the like, of molten matrix metal beyond a surface boundary of a permeable mass of filler material or preform. Thus, the primary method by which a material functions as a barrier material determines whether the material will be classified as a physical barrier or a reactive barrier.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or prefarm, "Spontaneous Infiltration", as used herein, means that the infiltration of matrix metal into tip permeable mass of filler or preform occurs without the requirement of the application of pressure or vacuum (whether externally applied or internally created).

BRIEF DESCRIPTION OF THE FIGURE

The following Figure is provided to assist in understanding the invention, but is not intended to limit the scope of the invention.

DETAILED DESCRIPTION OF THE INVENTION AND PREFERRED EMBODIMENTS

Figure 1:
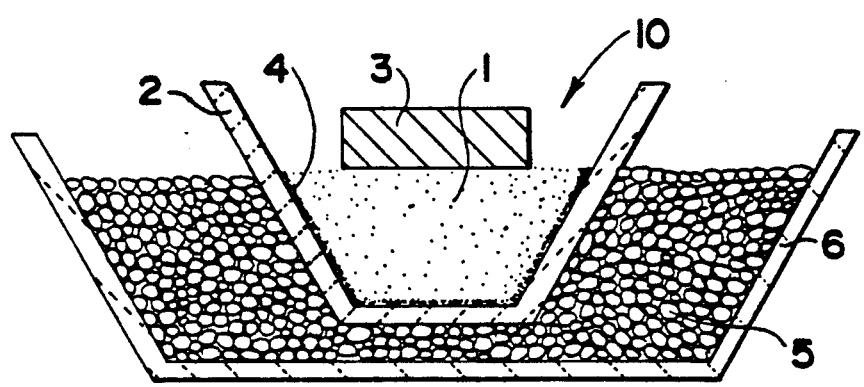
FIG. 1 is a cross-sectional schematic of a typical lay-up used to form a shaped metal matrix composite body as described below.

The present invention relates to forming a shaped metal matrix composite by spontaneously infiltrating a molten matrix metal into a filler material or preform up to a barrier material. Particularly, an infiltration enhancer and/or an infiltration enhancer precursor and/or an infiltrating atmosphere are in communication with the filler material or preform, at least at some point during the process, which permits molten matrix metal to spontaneously infiltrate the filler material or preform up to the barrier material.

With reference to FIG. 1, a simple lay-up 10 for forming a spontaneously infiltrated metal matrix composite is illustrated. Specifically, a filler or preform 1, which may be of any suitable material, as discussed in detail below, is placed in a vessel 2. The interior surfaces of the vessel 2 are coated with a barrier material 4. A matrix metal 3 is placed on or adjacent to the filler or preform 1 to form a setup. The setup is then placed within a mass of support material 5 contained within a refractory boat 6. The lay-up, comprising the refractory boat 6 and its contents, is thereafter placed in a furnace and heated to a temperature above the melting point of the matrix metal to initiate spontaneous infiltration. As set forth above, an infiltration enhancer and/or an infiltration enhancer precursor and/or an infiltrating atmosphere are in communication with the filler material or preform, at least at some point during the process, which permits the molten matrix metal to spontaneously infiltrate the filler material or preform.

Without wishing to be bound by any particular theory or explanation, when an infiltration enhancer precursor is utilized in combination with at least one of the matrix metal, and/or filler material or preform and/or infiltrating atmosphere, the infiltration enhancer precursor may react to form an infiltration enhancer which induces or assists molten matrix metal to spontaneously infiltrate a filler material or preform. Moreover, it appears as though it may be necessary for the precursor to the infiltration enhancer to be capable of being positioned, located or transportable to a location which permits the infiltration enhancer precursor to interact with at least one of the infiltrating atmosphere, and/or the preform or filler material, and/or molten matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

Thus, for example, if an infiltration enhancer precursor was included or combined with, at least at some point during the process, molten matrix metal, it is possible that the infiltration enhancer could volatilize from the molten matrix metal and react with at least one of the filler material or preform and/or the infiltrating atmosphere. Such reaction could result in the formation of a solid species, if such solid species was stable at the infiltration temperature, said solid species being capable of being deposited on at least a portion of the filler material or preform as, for example, a coating. Moreover, it is conceivable that such solid species could be present as a discernable solid within at least a portion of the preform or filler material. If such a solid species was formed, molten matrix metal may have a tendency to react (e.g., the molten matrix metal may reduce the formed solid species) such that infiltration enhancer precursor may become associated with (e.g., dissolved in or alloyed with) the molten matrix metal. Accordingly, additional infiltration enhancer precursor may then be available to volatilize and react with another species (e.g., the filler material or preform and/or infiltrating atmosphere) and again form a similar solid species. It is conceivable that a continuous process of conversion of infiltration enhancer precursor to infiltration enhancer followed by a reduction reaction of the infiltration enhancer with molten matrix metal to again form additional infiltration enhancer, and so on, could occur, until the result achieved is a spontaneously infiltrated metal matrix composite.

In order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere; and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In a preferred embodiment of the invention, it is possible that the infiltration enhancer precursor can be at least partially reacted with the infiltrating atmosphere such that the infiltration enhancer can be formed in at least a portion of the filler material or preform prior to or substantially contiguous with contacting the filler material or preform with the matrix metal (e.g., if magnesium was the infiltration enhancer precursor and nitrogen was the infiltrating atmosphere, the infiltration enhancer could be magnesium nitride which would be located in at least a portion of the preform or filler material).

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not adversely react with the aluminum matrix metal and/or the filler material when the aluminum is made molten. A filler material or preform can thereafter be contacted with molten aluminum matrix metal and spontaneously infiltrated.

Moreover, rather than supplying an infiltration enhancer precursor, an infiltration enhancer may be supplied directly to at least one of the preform or filler material, and/or matrix metal, and/or infiltrating atmosphere. Ultimately, at least during the spontaneous infiltration, the infiltration enhancer should be located in at least a portion of the filler material or preform.

Under the conditions employed in the method of the present invention, in the case of an aluminum/magnesium/nitrogen spontaneous infiltration system, the preform or filler material should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated preform to be infiltrated spontaneously with molten matrix metal to form a metal matrix composite body and/or cause the nitrogen to react with an infiltration enhancer precursor to form infiltration enhancer in the filler material or preform and thereby result in spontaneous infiltration. The extent of spontaneous infiltration and formation of the metal matrix composite will vary with a given set of process conditions, including magnesium content of the aluminum alloy, magnesium content of the preform or filler material, amount of magnesium nitride in the preform or filler material, the presence of additional alloying elements (e.g., silicon, iron, copper, manganese, chromium, zinc, and the like), average size of the filler material (e.g., particle diameter) comprising the preform or the filler material, surface condition and type of filler material or preform, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform. Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the preform (or filler material) and matrix metal or the preform (or filler material) alone may result in a reduction in required amount of magnesium to achieve spontaneous infiltration (discussed in greater detail later herein).

The volume percent of nitrogen in the infiltrating atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for the molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 Crystolon (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). For example, in the aluminum/magnesium/nitrogen system, if the magnesium was applied to a surface of the matrix metal it may be preferred that the surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g., to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, in the aluminum/magnesium/nitrogen system spontaneous and progressive infiltration will occur at a process temperature of at least about 675° C., and preferably a process temperature of at least about 750° C.-800° C. Temperatures generally in excess of 1200° C. do not appear to benefit the process, and a particularly useful temperature range has been found to be from about 675° C. to about 1000° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable filler material or preform comes into contact with molten aluminum in the presence of, at least sometime during the process, a nitrogen-containing gas. The nitrogen-containing gas may be supplied by maintaining a continuous flow of gas into contact with at least one of the filler material or preform and/or molten aluminum matrix metal. Although the flow rate of the nitrogen-containing gas is not critical, it is preferred that the flow rate be sufficient to compensate for any nitrogen lost from the atmosphere due to any nitride formation, and also to prevent or inhibit the incursion of air which can have an oxidizing effect on the molten metal.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product. For example, when aluminum is the matrix metal, suitable filler materials include (a) oxides, e.g. alumina, magnesia, zirconia; (b) carbides, e.g. silicon carbide; (c) borides, e.g. aluminum dodecaboride, titanium diboride, and (d) nitrides, e.g. aluminum nitride, and (e) mixtures thereof. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous.

It also has been discovered that certain filler materials exhibit enhanced infiltration relative to filler materials having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Copending and Commonly Owned application Ser. No. 819,397, entitled "Composite Ceramic Articles and Methods of Making Same", in the names of Marc S. Newkirk et al., also exhibit desirable infiltration properties relative to commercially available alumina products. The subject matter of each of the issued Patent and Copending Patent Application is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patent and Patent Application.

The size, shape, chemistry and volume percent of the filler material (or preform) can be any that may be required to achieve the properties desired in the composite. Thus, the filler material may be in the form of particles, whiskers, platelets or fibers since infiltration is not restricted by the shape of the filler material. Other shapes such as spheres, tubules, pellets, refractory fiber cloth, and the like may be employed. In addition, the size of the filler material does not limit infiltration, although a higher temperature or longer time period may be needed for complete infiltration of a mass of smaller particles than for larger particles or vice-versa depending on the particular reaction conditions. Average particle diameters as small as a micron or less to about 1100 microns or more can be successfully utilized in the present invention, with a range of about 2 microns through about 1000 microns being preferred for a vast majority of commercial applications. Further, the mass of filler material (or preform) to be infiltrated should be permeable (i.e., contain at least some interconnected porosity to render it permeable to molten matrix metal and/or to the infiltrating atmosphere). Moreover, by controlling the size (e.g., particle diameter) and/or geometry and/or composition of the filler material or the material comprising the preform, the physical and mechanical properties of the formed metal matrix composite can be controlled or engineered to meet any number of industrial needs. For example, wear resistance of the metal matrix composite can be increased by increasing the size of the filler material (e.g., increasing the average diameter of the filler material particles) given that the filler material has a higher wear resistance than the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, coefficient of thermal expansion, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler materials, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, alone or in combination, a metal matrix composite can be engineered to contain a desired combination of properties.

The method of forming metal matrix composites according to the present invention, not being dependent on the use of pressure to force or squeeze molten matrix metal into a preform or a mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with closed cell porosity or into a fully dense structure that would prevent infiltration by the molten alloy. Specifically, volume fractions on the order of about 60 to 80 volume percent can be achieved by methods such as vibrational packing, controlling particle size distribution, etc. However, alternative techniques can be utilized to achieve even higher volume fractions of filler. Volume fractions of filler on the order of 40 to 50 percent are preferred for thermo-forming in accordance with the present invention. At such volume fractions, the infiltrated composite maintains or substantially maintains its shape, thereby facilitating secondary processing. Higher or lower particle loadings or volume fractions could be used, however, depending on the desired final composite loading after thermo-forming. Moreover, methods for reducing particle loadings can be employed in connection with the thermo-forming processes of the present invention to achieve lower particle loadings.

It has been observed that for aluminum infiltration and matrix formation around a ceramic filler, wetting of the ceramic filler by the aluminum matrix metal may be an important part of the infiltration mechanism. Further, the wetting of the filler by molten matrix metal may permit a uniform dispersion of the filler throughout the formed metal matrix composite and improve the bonding of the filler to the matrix metal. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Further, the constituency of the matrix metal within the metal matrix composite and defects, for example, porosity, may be modified by controlling the cooling rate of the metal matrix composite. For example, the metal matrix composite may be directionally solidified by any number of techniques including: placing the container holding the metal matrix composite upon a chill plate; and/or selectively placing insulating materials about the container and/or placing "hot-topping" materials in contact with the container. Further, the constituency of the metal matrix may be modified after formation of the metal matrix composite. For example, exposure of the formed metal matrix composite to a heat treatment may improve the tensile strength of the metal matrix composite. (The standard test for tensile strength is ASTM-D3552-77 (reapproved 1982).)

For example, a desirable heat treatment for a metal matrix composite containing a 520.0 aluminum alloy as the matrix metal may comprise heating the metal matrix composite to an elevated temperature, for example, to about 430° C., which is maintained for an extended period (e.g., 18-20 hours). The metal matrix may then be quenched in boiling water at about 100° C. for about 20 seconds (i.e., a T-4 heat treatment) which can temper or improve the ability of the composite to withstand tensile stresses.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition from the first source of matrix metal, it is possible to tailor the properties of the metal matrix to meet various operating requirements and thus tailor the properties of the metal matrix composite.

A barrier means may also be utilized in combination with the spontaneous infiltration of molten matrix metal into a filler material or preform. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement beyond the defined surface boundary of the ceramic filler. Barrier means may be used during spontaneous infiltration or in any molds or other fixtures utilized in connection with thermo-forming of the spontaneously infiltrated metal matrix composite, as discussed in greater detail below.

There are many different types of materials which are useful as barrier means for the spontaneous infiltration process. Generally, these materials fall into two broad categories, reactive barriers and physical barriers.

A reactive barrier is a material which reacts with at least one of the molten matrix metal, infiltration enhancer, infiltration enhancer precursor, filler material, and infiltrating atmosphere to either produce or remove a substance from the spontaneous infiltration system resulting in the interference, inhibition, prevention, or termination, of the migration, movement or the like, of molten matrix alloy beyond the defined surface boundary of the filler material or preform. For example, a reactive barrier may react with a molten matrix metal to form a compound which acts as a barrier to further infiltration of the molten matrix metal. Alternatively, a reactive barrier may locally consume or modify at least one of the infiltration enhancer, infiltration enhancer precursor, or infiltrating atmosphere, in such a way as to prevent further infiltration of the molten matrix metal into the affected region. Examples of reactive barriers for use with an aluminum alloy matrix metal and a nitrogen atmosphere are $CaCO_3$, $AlPO_4$, and colloidal $SiO_2$.

Physical barriers can be defined as those barriers which are not reactive barriers. Physical barriers include those materials which are effective barriers and could be reactive barriers but do not function as reactive barriers because the reaction kinetics between the material and the molten matrix metal and/or infiltration enhancer and/or infiltration enhancer precursor and/or filler material and/or infiltrating atmosphere, are too slow to allow the material to function effectively as a reactive barrier. In addition, physical barriers also include those materials which are simply nonreactive with any of the spontaneous infiltration system components, or nonwettable by the matrix metal. Examples of physical barriers for an aluminum alloy matrix metal with a nitrogen atmosphere are colloidal graphite and glass forming materials. The glass forming materials can be mixed with a particulate material and are sometimes effective as physical barriers even when mixed with particulate material which would not normally act as a barrier material.

Certain types of material may act partially as a reactive barrier and partially as a physical barrier. In those situations, the material would be classified as a physical barrier or a reactive barrier depending on which aspect was more effective at preventing the molten matrix metal from infiltrating beyond the desired boundaries of a mass of filler material or a preform. An example of a material which may function as both a physical barrier and a reactive barrier is very fine alumina particulate. For example, Grade A-17 alumina having an average particle size of about 3.5 microns (produced by Alcoa Industrial Products, Bauxite Ark.) is believed to function as both a reactive barrier and a physical barrier. However, it is further believed that such fine particulate alumina acts more as a reactive barrier than as a physical barrier. Therefore, the fine particulate alumina would be classified as a reactive barrier.

Additional barrier discussion, including discussion of various specific types of barrier materials, is included in the following paragraphs.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particular preferred graphite is a graphite foil product that is sold under the trademark Grafoil ®, registered to Union Carbide. This graphite foil exhibits sealing characteristics that prevent the migration of molten aluminum alloy beyond the defined surface boundary of the filler material. This graphite foil is also resistant to heat and is chemically inert. Grafoil ® graphite foil is flexible, compatible, conformable and resilient. It can be made into a variety of shapes to fit any barrier application. Grafoil ® is particularly preferred in the method of the instant invention because it is in the form of a flexible graphite sheet. In use, this paper-like graphite is simply formed around the filler material or preform. However, graphite barrier means may also be employed as a slurry or paste or even as a paint film around and on the boundary of the filler material or preform. Certain types of colloidal graphite are particularly preferred in this embodiment of the instant invention.

As discussed above, barrier means may be used during spontaneous infiltration or in any molds or other fixtures utilized in connection with thermo-forming of the spontaneously infiltrated metal matrix composite. The previous paragraph discusses the use of carbon, and especially the crystalline allotropic form of carbon known as graphite, as a barrier material which may be used during spontaneous infiltration. In addition, carbon, especially in the form of graphite, can be used a barrier material for thermo-forming the spontaneously infiltrated metal matrix composite. For example, if a formed metal matrix composite body is subjected to temperatures above the melting point of the matrix metal, some of the matrix metal may bleed out of the surface of the formed metal matrix composite body. This phenomenon can be controlled by utilizing a barrier material which contacts or coats the surfaces of the metal matrix composite body which would be affected by the above-described phenomenon. Thus, a metal matrix composite body formed by spontaneous infiltration could be heat treated at a temperature which is above the melting point of the matrix metal without any bleeding of matrix metal which might undesirably affect the properties of the metal matrix composite body. Such heat treating could be used to affect or enhance one or more properties of the final metal matrix composite body. In addition, the metal matrix composite body could be deformed after the spontaneous infiltration step by exerting pressure on the metal matrix composite body at a temperature above the melting point of the matrix metal. In certain situations, it may be necessary to utilize a barrier material to contain or shape the deformed metal matrix composite body. The above-description of alternate uses for barrier materials relating to spontaneously infiltrated metal matrix composite bodies is not intended to be exhaustive. Barriers will be useful in a wide variety of situations where formed metal matrix composite body is to be utilized above the temperature of the melting point of the matrix metal.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. Moreover, the particle size of the barrier material may affect the ability of the material to inhibit spontaneous infiltration. The transition metal borides are typically in a particulate form (1-30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatile organic compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means or by encasing a filler material or preform within a barrier structure. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

Various demonstrations of the present invention are included in the Examples immediately following. However, these Examples should be considered as being illustrative and should not be construed as limiting the scope of the invention as defined in the appended claims.

EXAMPLE 1

This Example demonstrates that thin metal matrix composite bodies having excellent surface finish can be produced by first coating the graphite mold housing and barrier means with a colloidal graphite prior to assembling the lay-up for the infiltration.

A rectangular shaped mold having a wall thickness of about 0.25 inches and an inner cavity measuring about 2.3 inches (58 mm) in length, about 0.44 inches (11 mm) in width and about 1.0 inch (25 mm) in height was machined from a solid piece of graphite. A graphite insert was fabricated such that when the insert was placed into the bottom of the graphite mold a 0.10 inch (2.5 mm) deep and a 0.03 inch (0.76 mm) wide channel was created between the perimeter of the insert and the inside wall of the rectangular mold. The interior surfaces of the mold and the exterior surfaces of the insert were then spray coated with a mixture comprising by volume equal parts of DAG ® 154 colloidal graphite (Acheson Colloids Company, Port Huron, Mich.) and ethyl alcohol. After drying the coating in air at ambient temperature for about ½ hour, the coating and drying process was repeated two more times to produce a total of three colloidal graphite coatings on the graphite mold and graphite insert. The coated graphite mold and insert were then placed separately into a resistance heated air atmosphere furnace at substantially room temperature. The furnace temperature was then increased to a temperature of about 380° C. at a rate of about 400° C. per hour. After maintaining a temperature of about 380° C. for about 2 hours, power to the furnace was turned off and the furnace was allowed to cool to substantially room temperature.

A metal gasket about 0.030 inch (0.76 mm) thick and sized to fit in the above-described channel between the graphite mold and the graphite insert and comprising by weight about 12 percent silicon and the balance aluminum was positioned in said channel. A slurry comprising by weight about 2 percent −325 mesh (particle diameter less than about 45 μm) magnesium powder (Reade Manufacturing Company, Lakehurst, N.J.), about 48 percent ethyl alcohol, and the balance a −325 mesh (particle diameter less than about 45 μm) metal alloy powder (Alcan Chemicals Division of Aluminum Company of Canada, Ltd., Montreal, PQ, Canada) comprising by weight about 7.5 to 9.5 percent silicon, about 0.7-1.0 percent iron, about 3.0-4.0 percent copper, ≦0.50 percent manganese, about 0.20-0.30 magnesium, ≦0.50 percent nickel, about 2.7-3.5 percent zinc, ≦0.35 percent tin, and the balance aluminum, was disposed on the top of the metal gasket and was permitted to flow freely within the above-described channel, thus covering any areas which were not already covered by the metal gasket. The mold and its contents were then placed onto a vibration table and vibrated for about 60 seconds. The vibration was ceased and the slurry was allowed to dry for about an additional two minutes. The metal powder on top of the metal gasket was removed with a small paint brush until the top of the gasket was again visible. Residual loose powder located on the surface of the gasket was blown out of the mold using compressed air. This procedure was continued until the only remaining loose powder was that covering areas on the bottom of the channel which were not covered by the metal gasket.

A filler material mixture was made by roll mixing for approximately ½ hour, in a two liter porcelain jar containing about four ½ inch (13 mm) diameter BURUNDUM ® ball milling stones (U.S. Stoneware, Mahwah, N.J.), approximately 412 grams of a mixture comprising by weight about 19 percent 500 grit (average particle diameter of about 17 μm) 39 CRYSTOLON ® silicon carbide (Norton Company, Worcester, Mass.), about 78 percent 220 grit (average particle diameter of about 16 μm) 39 CRYSTOLON ® silicon carbide and about 3 percent −325 mesh (particle diameter less than about 45 μm) magnesium powder (Reade Manufacturing Company, Lakehurst, N.J.). The ball milling stones were removed from the jar and the jar and its contents were placed into a vacuum oven. The oven chamber was evacuated to about 30 inches (762 mm) of mercury vacuum and the oven temperature was raised to about 150° C. The filler material was subjected to this environment for at least about 12 hours prior to its incorporation in the lay-up. The fabrication of the filler material mixture was completed by removing the ball milling jar and its contents from the vacuum oven, capping the jar, and shaking the jar by hand for about 5 minutes.

About 14 grams of the filler material mixture were poured into the graphite mold, a quantity sufficient to fill the channel between the mold and the graphite insert and to cover the top of the insert to a depth of about 0.18 inch 4.6 mm). The filler material mixture was thereafter leveled within the mold. The surface of the filler material mixture was then dusted with −50 mesh (average particle diameter of about 300 μm) ALFA ® magnesium particulate (Alfa Products, Division of Johnson Matthey Company, Ward Hill, Mass.) until a concentration of about 6.2 milligrams per square centimeter was achieved. Matrix metal ingots comprising by weight about 12 percent silicon, about 2.5 percent nickel, about 1 percent copper, and the balance aluminum, and weighing a total of about 21 grams were scored with a coarse file to remove as much oxide skin on the ingots as possible. The ingots were then placed into and supported by two copper foil slings positioned above the filler bed, each sling measuring about 1 inch (25 mm) long and about ⅛ inch (3 mm) wide. The mold and its contents were then placed into a stainless steel container measuring about 7 inches (178 mm) long, about 3.25 inches (83 mm) wide and about 5 inches (127 mm) high on top of an approximately ¼ inch (6 mm) thick layer of Grade A aluminum nitride particulate (average particle diameter 4.0 μm) (Starck B, Hermann C. Starck, Inc., New York, N.Y.). The stainless steel container and its contents were placed into a resistance heated controlled atmosphere furnace. The furnace chamber was evacuated to about 30 inches (762 mm) of mercury vacuum. The furnace temperature was then increased from substantially room temperature to about 200° C. at a rate of about 400° C. per hour. After holding the stainless steel container and its contents in the furnace under vacuum and at a temperature of about 200° C. for about 2 hours, the furnace chamber was backfilled with nitrogen to substantially atmospheric pressure. A nitrogen gas flow rate of about 5 liters per minute was established. The furnace temperature was increased from about 200° C. to about 800° C. at a rate of about 90° C. per hour. After maintaining a temperature of about 800° C. for about 3 hours, the temperature was decreased to about 750° C. at a rate of about 400° C. per hour. At a temperature of about 750° C., the stainless steel container and its contents were removed from the furnace and the graphite mold and its contents were placed upon a water cooled copper chill plate to directionally solidify the molten metal contained within the graphite mold. The top and sides of the mold were covered with CARBORUNDUM ® FIBERFRAX ® ceramic fiber insulation (Standard Oil Engineered Materials Company, Niagara Falls, N.Y.) of at least one inch (25 mm) thickness to assist in the directional solidification process. Thus, by maintaining the high temperature at the top of the graphite mold and providing a heat sink at the bottom of the graphite mold, directional solidification of the molten matrix metal contained within the graphite mold was effected.

After cooling to substantially room temperature, the graphite mold was disassembled to reveal that the matrix metal had infiltrated the filler material mixture to produce a metal matrix composite body having substantially the same shape as the original graphite mold cavity, i.e., the configuration of an open-ended box. Furthermore, the metal gasket first placed into the graphite mold cavity had fused and bonded to the metal matrix composite material to yield an unreinforced metal lip along the top edge of the metal matrix composite body. Thus, the final body produced in the instant Example comprised a macrocomposite body and both the metal matrix composite portion and the metal lip portion of the macrocomposite had an excellent surface finish.

EXAMPLE 2

This Example demonstrates that a metal matrix composite barrier comprising colloidal graphite can be placed directly onto a preform to be infiltrated with a matrix metal.

About 25 grams of −325 mesh (particle diameter less than about 45 μm) AESAR ® magnesium powder (AESAR Group of Johnson Matthey Company, Seabrook, N.H.) was combined with about 475 grams of Grade A-200 aluminum nitride powder (Advanced Refractory Technologies, Inc., Buffalo, N.Y.). This mixture was placed into a 1 liter plastic jar which contained about 250 grams of BURUNDUM ® alumina milling media (U.S. Stoneware, Mahwah, N.J.) measuring about ½ inch (13 mm) in diameter by about ½ inch (13 mm) tall. The contents of the jar were roll mixed for about 1 hour. The roll mixed powders were then screened to separate the powder from the milling media. About 250 grams of screened powder was then poured into a pressing die. The powder was uniaxially pressed under an applied load of about 45,000 pounds to form a tile shaped preform. The pressed tile preform measured about 3 inches (76 mm) square and about ⅞ inch (22 mm) tall.

The pressed tile preform was coated on all sides except one about 3 inches (76 mm) square face with an AERODAG ® G colloidal graphite aerosal spray (Acheson Colloids Company, Port Huron, Mich.).

After drying the coating in air at room temperature for about ½ hour, a second spray coating of colloidal graphite was applied to the same surfaces of the preform. After drying the coated preform again in air at about room temperature for about ½ hour, a coating of DAG® 154 colloidal graphite (Acheson Colloids Company, Port Huron, Mich.) was painted on the surfaces that had been previously spray coated. After drying this colloidal graphite layer in substantially the same manner as was used to dry the spray coated colloidal graphite layers, three additional coatings of DAG 154 colloidal graphite were painted on the previously coated preform tile surfaces with ½ hour drying periods between each coating step. After the last coating of colloidal graphite had been applied to the preform, the coated preform was allowed to air dry at about room temperature for about 3 to 5 hours.

A graphite boat measuring about 6 inches (152 mm) square and about 3 inches (76 mm) tall was coated on its interior surfaces with DAG 154 colloidal graphite (described above) and allowed to air dry at about room temperature for about 3 to 5 hours. Loose particulate E1 ALUNDUM® alumina (Norton Company) was poured into the coated graphite boat to a depth of about ¾ inch (19 mm). The coated preform was placed into the coated graphite boat on top of the alumina bedding, with the uncoated face up. Additional E1 ALUNDUM® alumina particulate material was then poured around the sides of the preform to a height substantially flush with the top of the preform. About 2 grams of −50 mesh (particle diameter less than about 300 μm) magnesium powder (Hart Corporation, Tamaqua, Pa.) was spread evenly over the exposed face of the preform.

An ingot of matrix metal measuring about 5 inches (127 mm) square and about 1 inch (25 mm) thick and comprising by weight about 12 percent silicon and the balance substantially pure aluminum was placed into the graphite boat on top of the magnesium powder coated preform so that one 5 inch (127 mm) square surface of the matrix metal ingot contacted the 3 inch (76 mm) square magnesium coated surface of the preform.

The graphite boat and its contents were placed into a resistance heated controlled atmosphere furnace. The furnace chamber was evacuated to about 30 inches (762 mm) of mercury vacuum and then backfilled with nitrogen gas. A nitrogen gas flow rate of about 3 liters per minute was established and maintained throughout the heating cycle. The furnace temperature was then increased from substantially room temperature to about 550° C. at a rate of about 200° C. per hour. After maintaining the temperature of about 550° C. for about 2 hours, the furnace temperature was increased to about 775° C. at a rate of about 200° C. per hour. After maintaining a temperature of about 775° C. for about 15 hours, the furnace temperature was then decreased to substantially room temperature at a rate of about 200° C. per hour. Once the furnace chamber had reached substantially room temperature, the graphite boat and its contents were removed from the furnace. The preform and residual matrix metal were removed from the graphite boat to reveal that the matrix metal had completely infiltrated the preform to produce a metal matrix composite. The matrix metal infiltration, however, did not proceed past the boundaries of the preform. Further inspection revealed that a metal matrix composite of near net shape and having excellent surface finish was produced.

EXAMPLE 3

A flange measuring about 3 inches (76 mm) in diameter by about 2 inches (51 mm) in height was spray coated with Grade MS-122 fluorocarbon release agent dry lubricant (Miller-Stephenson Company, Inc., Danbury, Conn.). GI-1000 rubber molding compound (Plastic Tooling Supply Company, Exton, Pa.) was cast around the spray coated flange to form a rubber mold inversely replicating the shape of the flange exterior. After curing the rubber molding compound in air for about 12 hours, the spray coated flange was separated from the mold. An exact wax model of the original flange was then made by casting Grade 5550-K. GRN. FLK. molten wax (Yates Manufacturing Company, Chicago, Ill.) at a temperature of about 110° C. into the rubber mold cavity left after the removal of the flange. The wax was then allowed to cool to room temperature. Before solidification, however, a mandrel was inserted into the wax, and the wax subsequently solidified around the mandrel, locking it in place. After the wax had cooled to substantially room temperature, the wax model and the mandrel were separated as a unit from the rubber mold.

An investment shell was then built up on the surface of the wax model. Specifically, the wax model was dipped into a slip or slurry comprising by weight about 67 percent pure calcium carbonate (Standard Ceramic Supply Company, Division of Chem-Clay Corp., Pittsburgh, Pa.), about 16.5 percent NYACOL® 2040 colloidal 40 weight percent silica (Nyacol Products, Inc., an affiliate of PQ Corporation, Ashland, Mass.), and about 16.5 percent water. The slip-coated wax model was then dusted or stuccoed with dry 90 grit (average particle diameter of about 216 μm) 37 CRYSTOLON® silicon carbide (Norton Co., Worcester, Mass.). The wax model and the developing investment shell were then dried for about ½ hour at about 65° F. (180° C.) in air. This dip-dust-dry sequence was then repeated. The coated wax model was then dipped into a slurry comprising by weight about 67 percent 500 grit (average particle diameter about 17 μm) 37 CRYSTOLON® silicon carbide (Norton Co.), about 16.5 percent NYACOL® 2040 colloidal 40 weight percent silica, and about 16.5 percent water. The coated wax model was then stuccoed with 24 grit (average particle diameter of about 1035 μm) 37 CRYSTOLON® silicon carbide (Norton Co.), after which it was again dried for about ½ hour at about 65° F. (180° C.) in air. This second dip-stucco-dry sequence was then repeated an additional three times. The coated wax model was then fired in a gas heated air atmosphere furnace at a temperature of about 700° C. for about 10 minutes to remove the wax model from the investment shell. The investment shell was then transferred from the about 700° C. gas fired furnace to a resistance heated air atmosphere furnace at a temperature of about 750° C. for about 2 to 3 hours to drive off the chemically bound water and to rigidize the shell. After this second firing, the investment shell was withdrawn from the approximately 750° C. furnace and placed on an approximately room temperature refractory plate to cool.

1000 grit (average particle diameter of about 5 μm) E67 ALUNDUM® alumina powder (Norton Company) was vacuum dried for about five hours at about 150° C. under about 30 inches (762 mm) of mercury vacuum. A −325 mesh (particle diameter less than about 45 μm) AESAR® magnesium powder (described above) was added to the alumina powder to produce an admixture comprising by weight about 10 percent magnesium. About 160 grams of the admixture was placed into a dry 1.1 liter alumina jar containing about 325 grams of dry one-half inch (13 mm) diameter BURUNDUM® alumina stones (U.S. Stoneware, Mahwah, N.J.) and milled for about two hours. The milled admixture was removed from the alumina jar and vacuum dried a second time for at least about four hours at about 150° C. under about 30 inches (762 mm) of mercury vacuum. The milled and dried admixture was poured into the investment shell, which was then placed onto a vibration table and vibrated for about 30 seconds. The investment shell was lightly hand tapped during the vibration period to collapse any void spaces in the admixture. After the vibration period, the admixture was leveled and $-50$ mesh (particle diameter less than about 30 $\mu$m) AESAR® magnesium particulate (AESAR Group of Johnson Matthey Company, Seabrook, N.H.), was sprinkled evenly over the surface of the admixture contained within the investment shell until a concentration of about 23 milligrams of magnesium per square centimeter of admixture surface was achieved.

The admixture-filled investment shell was then placed in a rectangular stainless steel can (AISI type 316 stainless steel) measuring about 10 inches (254 mm) by about 12 inches (305 mm) by about 10 inches (254 mm) tall. An about 270 gram ingot of standard 520 aluminium alloy having a nominally identified composition by weight of about $\leq 0.25\%$ Si, $\leq 0.30\%$ Fe, $\leq 0.25\%$ Cu, $\leq 0.15$ Mn, 9.5–10.6% Mg, $\leq 0.15\%$ Zn, $\leq 0.25$ Ti and the aluminum, was placed in the investment shell in contact with the magnesium coated surface of the admixture. About 5 grams of TI-LOY 97 titanium sponge (Chemalloy Co., Bryn Mawr, Pa.) was placed in the stainless steel can outside of the investment shell. The function of the titanium sponge was to act as an oxygen-getter. A copper sheet measuring about 14 inches (356 mm) by about 16 inches (406 mm) by about 6 mils (0.15 mm) thick was placed over the opening of the can. Those portions of the copper sheet extending over the sides of the can were folded down against the sides of the can to form an isolated chamber. A nitrogen gas feed tube extended through one side of the stainless steel can.

The stainless steel can and its contents were placed into a resistance heated air atmosphere furnace. The furnace was closed, and a nitrogen gas flow rate of about 2.5 liters per minute was provided to the interior of the can through the feed tube. The furnace was then heated to about 800° C. over a period of about 1.5 hours and maintained at about 800° C. for about 1 hour. After the above-described heating period, the investment shell and its contents were removed from the furnace at about 800° C. and placed onto a bed of sand at room temperature. After the investment shell and its contents had cooled to substantially room temperature, the investment shell was removed to reveal that the matrix metal had infiltrated the admixture to form a metal matrix composite in the shape of the flange.

EXAMPLE 4

This Example demonstrates that a slip cast body can serve as a barrier material for metal matrix composite formation.

Grade A-17 alumina powder (Alcoa Industrial Chemicals Division, Bauxite, Ark.) was stirred into a quantity of water containing DARVAN® 821A dispersant (R. T. Vanderbilt Company, Inc., Norwalk, Conn.) such that the composition of the final slurry comprised by weight about 15 percent water, about 0.1 percent dispersant and the balance alumina. About 500 milliliters of this slurry was poured into a one liter plastic jar and roll mixed for about 16 hours. The slip was then cast into a two piece plaster of paris mold having an internal cavity measuring about 1.5 inches (38 mm) square and about 7 inches (178 mm) tall. When the casting on the mold wall reached a thickness of about ¼ inch (6 mm), the excess slip was drained from the mold and the casting was allowed to dry for several hours. The slip cast shell was then removed from the two piece mold and allowed to dry in air for an additional 24 hours. After drying, the slip cast shell was placed onto a layer of 90 grit (average particle diameter of about 216 $\mu$m) 38 ALUNDUM® alumina (Norton Co.) which was supported by a refractory plate measuring about 6 inches (152 mm) by about 11 inches (279 mm) by about 1 inch (25 mm) thick. The refractory plate bearing the slip cast shell was then placed into a resistance heated air atmosphere furnace and heated to about 1050° C. over a period of about 24 hours. The furnace temperature was maintained at about 1050° C. for about 2 hours after which time the furnace was allowed to cool naturally. Once the furnace temperature had substantially returned to room temperature, the fired slip cast alumina shell was removed from the furnace.

About 2 percent by weight $-325$ mesh (particle diameter less than about 45 $\mu$m) magnesium powder (Hart Corporation, Tamaqua, Pa.) was added to a filler material comprising 220 grit (average particle diameter of about 66 $\mu$m) 39 CRYSTOLON® green silicon carbide (Norton, Co.). About 500 milliliters of this particulate mixture was placed into a one liter plastic jar and roll mixed for about an hour. About 80 grams of this mixture was then poured into the fired slip cast alumina shell. About 0.5 grams of $-50$ mesh (particle size less than about 300 gm) magnesium powder (Hart Corporation, Tamaqua, Pa.) was then evenly distributed on top of the silicon carbide filler mixture. A matrix metal ingot measuring about ¾ inch (19 m) square and about 4 inches (102 mm) long and comprising by weight about 11.0–13.0%Si, $\leq 2.0\%$Fe, $\leq 1.0\%$Cu, $\leq 0.35\%$.Mn, $\leq 0.1\%$Mg, $\leq 0.57\%$Ni, $\leq 0.5\%$Zn, $\leq 0.15\%$Sn, and the balance aluminum, was placed into the fired slip cast alumina shell on top of the magnesium powder to form a lay-up. The lay-up was then placed onto an about 1 inch (25 mm) thick layer of loose 90 grit (average particle diameter of about 216 $\mu$m) E1 ALUNDUM®, (Norton Co.) alumina powder contained within a stainless steel can measuring about 6 inches (153 mm) square and about 3 inches (153 mm) tall. An additional 3 inches (76 mm) of 90 grit E1 ALUNDUM®) powder was poured into the stainless steel can around the lay-up. The stainless steel can and its contents were then placed into a resistance heated controlled atmosphere furnace. The furnace chamber was evacuated to about 30 inches (762 mm) of mercury vacuum and then backfilled with nitrogen gas. A nitrogen gas flow rate of about 4 liters per minute was established. The furnace was then heated from about room temperature to about 775° C. at a rate of about 200° C. per hour. The furnace temperature was maintained at about 775° C. for about 11 hours before it was reduced to about 750° C. at a rate of about 150° C. per hour. At about 750° C., the stainless steel can was removed from the furnace and placed onto a graphite chill plate. The top of the residual pool of matrix metal contained within the lay-up was then covered with a particulate mixture of a FEEDOL ® No. 9 hot topping agent (Foseco, Inc., Cleveland, Ohio) to create an exothermic reaction on the top of the lay-up. By providing a heat source on the top of the lay-up and a heat sink on the bottom of the lay-up, directional solidification of the molten matrix metal was effected.

After the stainless steel can and its contents had cooled to substantially room temperature, the fired slip cast alumina shell and its contents were removed from the can. The fired slip cast alumina shell was then removed by sandblasting to reveal that the matrix metal had infiltrated the silicon carbide filler material to produce a metal matrix composite body. Further inspection revealed that the metal matrix composite body had closely replicated the interior shape of the slip cast alumina shell. In addition, little or no infiltration had occurred into the slip cast alumina shell.

EXAMPLE 5

This Example demonstrates that fine grained alumina material is not only useful as a barrier material in the form of a shell or container for a loose mass of filler material, but also can be applied directly to a preform as a coating.

About 25 grams of −325 mesh (particle diameter less than about 45 μm) AESAR ® magnesium powder (AESAR Group of Johnson Matthey Company, Seabrook, N.H.) were added to about 475 of Grade A-200 LX aluminum nitride powder (Advanced Refractory Technologies, Inc., Buffalo, N.Y.). This admixture was placed into a one liter plastic jar which contained about 250 grams of ½ inch (13 mm) diameter by ½ (13 mm) inch tall BURUNDUM ® alumina milling media. The contents of the jar were roll mixed for about one hour. The roll mixed powders were then screened to separate the powder from the milling media. About 150 grams of screened powder were then poured into a pressing die. The powder was uniaxially pressed under an applied load of about 45,000 lbs to form a tile-shaped preform. The preform measured about 3 inches (76 mm) square and about ½ inch (13 mm) tall.

The preform was then coated on all sides except one 3 inch (76 mm) square facelwith a slurry comprising by weight about 33 percent Grade A-1000 alumina (Alcoa Industrial Chemical Divisions, Bauxite, Ark.) of submicron particle size and the balance ethyl alcohol. After drying the coating in air at room temperature for about ½ hour, two additional coatings of submicron alumina were spray coated onto the preform tile over the first coating with a ½ hour drying period between the second and third coat. After the last coating of submicron alumina had been applied to the preform, the coated preform was placed into a forced air drying oven at a temperature of about 70° C. and allowed to dry for about 1 hour.

A graphite boat measuring about 6 inches (152 mm) square and about 3 inches (76 mm) tall was filled to a uniform depth of about ¾ inch (19 mm) with 90 grit (average particle diameter of about 216 μm) 38 ALUNDUM ® alumina particulate (Norton, Co.). The coated preform was then placed into the graphite boat and centered on top of the alumina bedding, uncoated face up. Additional alumina particulate bedding material was then poured around the sides of the preform to a height substantially flush with the top of the preform. About 2 grams of −50 mesh (particle diameter less than about 300 gm) magnesium particulate (Hart Corporation, Tamaqua, Pa.) were then spread evenly over the exposed face of the preform.

An ingot of matrix metal measuring about 5 inches (127 mm) square and about 1 inch (25 mm) thick and comprising by weight about 11.0 to 13.0 percent silicon, $\leq$2.0 percent iron, $\leq$1.0 percent copper, $\leq$0.35 manganese, $\leq$0.10 percent magnesium, $\leq$0.50 percent nickel, $\leq$0.50 percent zinc, $\leq$0.15 percent tin and the balance aluminum, was placed on top of the magnesium particulate coating on the exposed face of the preform to form a lay-up.

The graphite boat and its contents were placed into a resistance heated controlled atmosphere furnace. The furnace chamber was evacuated to about 30 inches (762 mm) of mercury vacuum and then backfilled with nitrogen gas. A gas flow rate of about 3 liters per minute was established. The furnace temperature was increased from substantially room temperature to a temperature of about 525° C. at a rate of about 200° C. per hour. After maintaining a temperature of about 525° C. for about 1 hour, the furnace temperature was then increased to about 775° C. at a rate of about 200° C. per hour. After maintaining a temperature of about 775° C. for about 10 hours, the furnace temperature was decreased to about 675° C. at a rate of about 200° C. per hour. The flow rate of nitrogen gas was maintained at about 3 liters per minute throughout the heating cycle. At a temperature of about 675° C., the graphite boat and its contents were removed from the furnace and placed on top of a water cooled aluminum chill plate. FEEDOL ® No. 9 particulate hot topping material (Foseco, Inc., Cleveland, Ohio) was poured on top of the residual molten matrix metal contained within the graphite boat to cause an exothermic reaction which supplied heat to the surface of the residual molten matrix metal. An about 2 inch (51 mm) thick layer of CERABLANKET ® ceramic fiber insulation (Manville Refractory Products, Denver, Colo.) was placed over the top of the graphite boat to help maintain the high temperature at the top of the graphite boat. Thus, by providing a heat source at the top of the graphite boat and a heat sink at the bottom of the graphite boat, directional solidification of the molten metal contained within the graphite boat was effected.

After the graphite boat and its contents had cooled to substantially room temperature, the lay-up was removed from the graphite boat. The submicron alumina barrier coating was then removed by sandblasting. Inspection of the resulting body revealed that at least some of the matrix metal had infiltrated the preform tile to produce a metal matrix composite body having substantially the same shape as the original preform. Further inspection revealed that the coating of fine particulate alumina on the preform was effective in preventing fine infiltration of the matrix metal into the90 grit alumina bedding material around the preform. Thus, this Example demonstrates that a fine particulate alumina material can also serve as a barrier material when it is applied directly (as a spray coating) to the surfaces of a preform of filler material.

EXAMPLE 6

This Example demonstrates that the surface finish of a metal matrix composite body made using a slip cast barrier shell can be improved by coating the barrier shell with colloidal graphite prior to use.

Grade A-17 alumina powder (Alcoa Industrial Chemicals Div., Bauxite, Ark.) was stirred into a quantity of water containing DARVANO 821A dispersant (R. T. Vanderbilt Company, Inc., Norwalk, Conn.) to produce a slurry comprising by weight about 15 percent water, about 0.1 percent dispersant, and the balance particulate alumina. About 500 milliliters of the slurry was poured into a one liter plastic jar and roll mixed for about 16 hours to form a slip. The slip was then cast into a two piece plaster of paris mold having an internal cavity measuring about 9 inches (229 mm) in height and having a diameter of about 2 inches (51 mm) for about the first 6 inches (152 mm) and a diameter of about 3 inches (76 mm) for about the top 3 inches (76 mm). When the casting on the mold wall reached a thickness of about ¼ inch (6 mm), the excess slip was drained from the two piece mold and the casting was allowed to dry in air for several hours at room temperature. The casting, a slip cast alumina barrier shell, was then removed from the two piece mold by separating the two mold halves. The slip cast barrier shell was then allowed to dry in air for an additional 24 hours. After drying, the slip cast barrier shell was placed onto a layer of 90 grit (average particle diameter of about 216 $\mu$m) 38 ALUNDUM ® alumina (Norton Co.) which was supported by a cordierite refractory plate measuring about 6 inches (152 mm) by about 11 inches (279 mm) by about 1 inch (25 mm) thick. The refractory plate bearing the slip cast barrier shell was placed into a resistance heated air atmosphere furnace and heated to about 1050° C. over a period of about 24 hours. The furnace temperature was maintained at about 1050° C. for about 2 hours after which time the furnace was allowed to cool naturally. Once the furnace temperature had substantially returned to room temperature, the fired slip cast barrier shell was removed from the furnace. The interior of the alumina barrier shell was then aerosol spray coated with AERODAG ® G colloidal graphite (Acheson Colloids Company, Port Huron, Mich.) and allowed to dry in air at ambient temperature for about ½ hour. Two additional colloidal graphite coatings were applied in a similar fashion, with ½ hour drying periods between coating applications. After application of the final colloidal graphite coating, the coated alumina barrier shell was allowed to dry in air at ambient temperature for about 3 to 5 hours.

About 10,000 grams of alumina milling media measuring about 0.94 inch (24 mm) in diameter and about 0.94 inch (24 mm) in length were placed into an 8 liter porcelain ball mill. About 5000 grams of −325 mesh (particle diameter less than about 45 $\mu$m) Grade T-64 particulate alumina filler material (Alcoa Industrial Chemicals Division, Bauxite, Ark.) filler material was added to the mill. After dry ball milling the alumina particulate for about 6 hours, the milling media was removed and about 200 grams of −325 mesh (particle diameter less than about 45 $\mu$m) magnesium particulate (Hart Corporation, Tamaqua, Pa.) was added. The admixture of ball milled alumina particulate and magnesium particulate was then roll mixed for about 2 hours.

About 1 gram of −50 mesh (particle diameter less than 300 $\mu$m) magnesium particulate (Hart Corporation) was sprinkled onto the bottom of the graphite coated alumina barrier shell. About 125 of the roll mixed filler admixture was then poured into the graphite coated alumina barrier shell on top of the layer of magnesium particulate. The surface of the filler admixture was then leveled and about 1 gram of the −50 mesh magnesium particulate material was sprinkled evenly over the surface of the filler admixture. An approximately 144 gram ingot of a matrix metal comprising by weight ≦0.25 percent silicon, ≦0.3 percent iron, ≦0.25 percent copper, ≦0.15 percent manganese, about 9.5–10.6 percent magnesium, ≦0.15 percent zinc, ≦0.25 percent titanium, and the balance aluminum, was placed into the coated alumina barrier shell on top of the magnesium particulate dusted surface of the filler admixture to form a lay-up. The lay-up was then placed into a stainless steel container measuring about 10 inches (254 mm) tall and about 4 inches (102 mm) in diameter. A bedding material comprising 220 grit (average particle diameter of about 66 $\mu$m) 38 ALUNDUM ® alumina (Norton Co.) was poured into the stainless steel container around the coated alumina barrier shell to a level about ½ to 1 inch (13 mm–25 mm) from the top of the barrier shell, to provide physical support for the shell and its contents.

The stainless steel container and its contents were placed into a resistance heated controlled atmosphere furnace. The furnace chamber was evacuated to about 20 inches (308 mm) of mercury vacuum and then back-filled with nitrogen gas to substantially atmospheric pressure. A nitrogen gas flow rate of about 4 liters per minute was established. The furnace temperature was increased from substantially room temperature to about 550° C. at a rate of about 200° C. per hour. After maintaining a temperature of about 550° C. for about 1 hour, the temperature was then increased to about 775° C. at a rate of about 150° C. per hour. After maintaining a temperature of about 775° C. for about 12 hours, the temperature was decreased to about 760° C. at a rate of about 150° C. per hour. The flow rate of nitrogen gas was maintained at about 4 liters per minute during the entire heating cycle.

At a temperature of about 760° C., the stainless steel container and its contents were removed from the furnace and placed upon a water cooled aluminum chill plate. FEEDOL ® No. 9 particulate hot topping material was poured onto the top of the residual molten matrix metal contained within the lay-up to cause an exothermic reaction which provided heat to the surface of the residual molten matrix metal. The top of the stainless steel container was then covered with an approximately 2 inch (51 mm) thick layer of a CERA-BLANKET ® ceramic fiber blanket material to help maintain the high temperature at the top of the lay-up. As described earlier, the combination of the heat source at the top of the lay-up and the heat sink at the bottom of the lay-up permitted the directional solidification of the molten matrix metal contained within the lay-up.

After the stainless steel container and its contents had cooled to substantially room temperature, the lay-up was removed from the stainless steel container. The graphite coated alumina barrier shell was removed with light hammer blows to reveal that the matrix metal had infiltrated the particulate alumina filler material to produce a metal matrix composite body. Further inspection revealed that the presence of the colloidal graphite coating on the interior of the slip cast alumina barrier shell resulted in less infiltration of the barrier shell by the molten matrix metal, which in turn resulted in the formation of a metal matrix composite body which possessed improved surface finish and was closer to net shape than a similar metal matrix composite body produced using an uncoated slip cast alumina barrier shell.

EXAMPLE 7

This Example illustrates that a shaped dense body can be used as a physical barrier during the formation of a metal matrix composite body to define a surface of the final metal matrix composite body.

A slip cast alumina barrier shell was fabricated by substantially the same technique outlined in Example 6. The interior of the shell was then aerosol spray coated with colloidal graphite, also by the same technique illustrated in Example 6.

About 0.5 of −50 mesh (particle diameter less than 300 μm) magnesium particulate (Hart Corporation, Tamaqua, Pa.) was sprinkled evenly over the bottom of the coated slip cast alumina barrier shell. A hollow graphite tube measuring about 1⅜ inches (35 mm) in outside diameter and about 4 inches (102 mm) tall was placed into the coated alumina barrier shell and centered on top of the magnesium particulate layer. The interior of the graphite tube was filled with 500 grit (average particle diameter of about 17 μm) 38 ALUNDUM ® alumina (Norton Co.) containing no infiltration enhancer precursor in an effort to prevent metal matrix composite formation inside of the graphite tube. Approximately 100 grams of a particulate filler blend comprising by weight about 4 percent −325 mesh (particle diameter less than 45 μm) magnesium powder (Hart Corporation) and the balance −325 mesh Grade T-64 tabular alumina (Alcoa Industrial Chemicals Division, Bauxite, Ark.) was processed by substantially the same technique as demonstrated in Example 6 and was then placed into the coated alumina barrier shell around the graphite tube and covering the top of the tube to a depth of about 1 inch (25 mm). After the surface of the filler admixture had been leveled, about 0.5 of the −50 mesh magnesium particulate (Hart Corporation) was sprinkled evenly over the surface of the filler admixture. An approximately 225 gram ingot of a matrix metal comprising by weight about 9.5-10.6 percent magnesium, ≦2.5 percent silicon, ≦0.30 percent iron, ≦0.25 percent copper, ≦0.15 percent manganese, ≦0.15 percent zinc, ≦0.25 percent titanium, and the balance aluminum, and measuring about 2 inches (51 mm) in diameter and about 1⅜ inches (41 mm) tall was placed into the coated alumina barrier shell and centered over the magnesium particulate dusted surface of the filler admixture to form a lay-up. The lay-up, comprising the coated alumina barrier shell and its contents, was then placed into a steel box measuring about 4 inches (102 mm) square and about 7 inches (178 mm) tall. The space between the steel box and the barrier shell was then filled with 220 grit (average diameter of about 66 μm) 38 ALUNDUM ® alumina (Norton Co.) which acted as support material for the barrier shell.

The steel box and its contents were placed into a resistance heated controlled atmosphere furnace. The furnace chamber was evacuated to about 20 inches (508 mm) of mercury vacuum and then backfilled with nitrogen gas to substantially atmospheric pressure. A nitrogen gas flow rate of about 4 liters per minute was established. The furnace temperature was increased from substantially room temperature to a temperature of about 550° C. at a rate of about 200° C. per hour. After maintaining a temperature of about 550° C. for about 1 hour, the temperature was then increased to about 775° C. at a rate of about 150° C. per hour. After maintaining a temperature of about 775° C. for about 15 hours, the temperature was decreased to about 760° C. at a rate of about 150° C. per hour. The nitrogen gas flow rate of about 4 liters per minute was maintained throughout the heating cycle. At a temperature of about 760° C., the steel box and its contents were removed from the furnace and placed on top of a water cooled aluminum chill plate. FEEDOL ® No. 9 hot topping particulate mixture was poured on top of the residual molten matrix metal contained within the lay-up to cause an exothermic reaction which supplied heat to the surface of the residual molten matrix metal. An about 2 inch (51 mm) thick layer of CERABLANKET ® ceramic fiber insulation was placed over the top of the lay-up to help maintain the high temperature at the top of the lay-up and thereby assist in the directional solidification of the molten metal contained within the lay-up. After the stainless steel container and its contents had cooled to about room temperature, the coated alumina barrier shell and its contents were removed from the steel box. The barrier shell was removed from the lay-up to reveal that at least some of the matrix metal had infiltrated the filler particulate admixture to form a metal matrix composite body in the shape of a tube. Some matrix metal had also infiltrated into some of the alumina powder contained within the graphite tube. The outside diameter of the metal matrix composite tube was defined by the interior surface of the coated alumina barrier shell and the interior diameter of the metal matrix composite tube was defined by the exterior surface of the graphite tube. Therefore, this Example demonstrates that a solid body of graphite can be used as a physical barrier during the formation of a metal matrix composite to define a surface of the final metal matrix composite body.

EXAMPLE 8

This Example demonstrates the use of an investment shell containment means containing a glass forming additive which strengthens the investment shell and improves the surface finish of the formed metal matrix composite body.

A metal matrix composite body in the shape of a slotted pin measuring about 2 inches (51 mm) long and about ⅝ inch (16 mm) in diameter was made by substantially the same techniques as the flange in Example 3, but with certain differences noted below. Specifically, an investment shell was built up upon a wax model of the slotted pin. The primary investment shell layer comprised by weight about 28.7 percent NYACOLφ 1430AT colloidal silica (Nyacol Products, Inc. an affiliate of PQ Corporation, Ashland, Mass.), about 63.2 percent −325 mesh (particle diameter less than about 45 μm) HUBERCARB ® Q 325 calcium carbonate (J. M Huber Corporation, Calcium Carbonate Div., Quincy, Ill.), about 4.3 percent 500 grit (average particle diameter of about 17 μm) 39 ALUNDUM ® green silicon carbide (Norton Co.), about 2.9 percent 500 grit TETRABOR ® boron carbide (Exolon-ESK Corporation, Tonawanda, N.Y.), about 0.6 percent VICTOWET ® 12 wetting agent (Ransom and Randolph Inc., Maumee, Ohio), and about 0.3 percent DCH Antifoam defoamer (Ransom and Randolph Inc., Maumee, Ohio). As in Example 3, two primary investment shell layers were applied. The secondary investment shell composition comprised by weight about one part REDIP ® indicator (Ransom and Randolph Company) about two parts VICTOWET ® 12 wetting agent, about 56 parts distilled water, about 274 parts NYACOL ® 830 colloidal silica and about 700 parts RANCO SIL ® No. 2 silica powder (Ransom and Randolph Company) to yield a slurry viscosity corresponding to about 15 seconds in a Zahn No. 4 cup. The slurry coated investment shell was then stuccoed or dipped in a fluidized bed of approximately 30 grit (average particle diameter of about 930 μm) RANCO ® SIL B silica sand (Ransom and Randolph, Inc.). The stuccoed investment shell was again dried at a temperature of about 65° F. (18°) for about 65° F. (18° C.) for about ½ hour or until the REDIP ® indicator in the shell changed in color from yellow-green to deep orange. This second dip-stucco-dry sequence was then repeated an additional five times. No prewetting of the investment shell with colloidal silica between dippings in the secondary investment shell slurry was required.

The coated wax mold was then given two firings, the first to remove the wax pattern and the second to rigidize the investment shell. The first firing comprised placing the coated wax pattern into a gas heated furnace at a temperature of about 800° C. After about 15 minutes at a temperature of about 800° C., virtually all of the Grade 5550-K. GRN. FLK. wax had either volatilized or been burned out of the shell. The shell was then removed from the furnace at a temperature of about 800° C. and directly placed into a resistance heated air atmosphere furnace at a temperature of about 850° C. for the second firing. After firing the shell at a temperature of about 850° C. for about 4 hours, the fired shell was removed from the resistance heated furnace and set onto a refractory plate to cool. It was observed that the investment shell had changed in color from light gray to nearly white as a result of at least some boron carbide in the shell oxidizing to glassy boric oxide during the second firing.

Grade T-64 tabular alumina powder (Alcoa Industrial Chemical Division, Bauxite, Ark.) was vacuumed dried for about 12 hours at a temperature of about 150° C. under about 30 inches (762 mm) of mercury vacuum. The alumina was then removed from the vacuum drying oven and combined with −325 mesh (particle diameter less than about 45 μm) AESAR ® magnesium powder to produce an admixture comprising by weight about 5 percent magnesium. About 160 grams of this admixture was placed into a dry 1.1 liter porcelain jar containing about 325 of dry about ½ inch (13 mm) diameter BURUNDUM ® alumina stones and milled for about 2 hours. The milled admixture was then removed from the porcelain jar and vacuum dried for at least four hours at about 150° C. under about 30 inches (762 mm) of mercury vacuum. About 68 grams of the milled and dried admixture was then poured into the investment shell. The investment shell was then gently tapped two or three times on a hard surface to remove any void spaces in the admixture. A thin layer of −50 mesh (particle diameter less than about 300 μm) magnesium particulate (Reade Manufacturing Company, Lakehurst, N.J.) was then sprinkled evenly over the top surface of the filler admixture until a concentration of about 12 milligrams per square centimeter was achieved. The magnesium particulate acted as an infiltration enhancer precursor.

The investment shell and its contents were then placed into a stainless steel can measuring about 10 inches (254 mm) wide by about 12 inches (305 mm) long by about 10 inches (254 mm) tall. An ingot of matrix metal, weighing about 167 grams and having substantially the same composition as the matrix metal employed in Example 6, was wedged into the investment shell, above but not in contact with, the magnesium particulate layer on the surface of the filler material admixture. About 5 of Grade RMC-3 magnesium turnings (Reade Manufacturing Company, Lakehurst, N.J.) and about 7 grams of TI-LOY 97 titanium sponge were placed into the stainless can outside of the investment shell. The magnesium turnings and the titanium sponge acted as oxygen-getters. A PERMA FOIL graphite foil sheet (TTAmerica, Portland, Oreg.) measuring about 4 inches (102 mm) square was placed over the opening in the investment shell. A copper sheet measuring about 14 inches (356 mm) by about 16 inches (406 mm) by about 6 mils (0.15 mm) thick was placed over the opening of the stainless steel can. Those portions of the copper sheet extending over the sides of the can were folded down tightly against the sides of the can to form an isolated chamber. A nitrogen gas feed tube extended through one side of the can.

The stainless steel can and its contents were placed into a resistance heated air atmosphere furnace. A nitrogen gas flow rate of about 14 liters per minute was provided to the interior of the stainless steel can through the feed tube. The furnace was then heated from substantially room temperature to a temperature of about 200° C. at a rate of about 600° C. per hour. After maintaining a temperature of about 200° C. for about 13¼ hours, the furnace temperature was increased to a temperature of about 760° C. at a rate of about 600° C. per hour. After maintaining a temperature of about 760° C. for about 1 hour, the nitrogen gas feed tube, which had been supplying nitrogen gas at a flow rate of about 14 liters per minute throughout the heating cycle, was disconnected from the stainless steel can. The can and its contents were then removed from the furnace and placed onto a water cooled copper chill plate. The copper and graphite foil sheets were removed from the stainless steel can and the investment shell, respectively, and a FEEDOL ® No. 9 hot topping particulate mixture was poured onto the top of the residual molten matrix metal contained within the investment shell to cause an exothermic reaction which supplied heat to the surface of the residual molten matrix metal, thereby assisting in the directional solidification of the molten matrix metal contained within the investment shell. The investment shell and its contents were removed from the stainless steel can.

After the stainless steel can and its contents had cooled to substantially room temperature, the investment shell was then removed with light hammer blows to reveal that at least some of the matrix metal had infiltrated the filler material admixture to form a metal matrix composite. Further inspection revealed that the formed metal matrix composite body was of substantially the same size and shape as the mold cavity defined by the investment shell. In addition, the surface finish of the formed metal matrix composite body was superior to the surface finish of metal matrix composite bodies produced with investment shells which did not contain the glass forming additive utilized in this Example.

EXAMPLE 9

The following Example demonstrates that a loose bed of alumina particulate and glass frit can be utilized as a barrier material which will prevent molten matrix metal from infiltrating beyond the boundaries of a sediment cast preform.

An aqueous solution of BLUONIC ® A colloidal alumina (Buntrock Industries, Inc., Lively, Va.) totalling about 261.4 grams was diluted with additional water amounting to about 522.8 grams and placed into an about 2 liter plastic jar. About 1280.9 grams of 220 grit (average particle diameter of about 66 μm) 39 CRYSTOLON® green silicon carbide particulate (Norton Co.) and about 548.9 grams of 500 grit (average particle diameter of about 17 μm) 39 CRYSTOLON® green silicon carbide particulate was added to the jar to prepare a slurry for sediment casting. The total slurry weight was about 2615 and comprised by weight about 49% 220 grit silicon carbide, about 21% 500 grit silicon carbide, about 2% colloidal alumina (dry basis), and about 28% water. After roll mixing for about 45 minutes, the slurry was poured into a silicone rubber mold with an internal cavity measuring about 7 inches (178 mm) square and about 1½ inches (38 mm) deep. The mold was then vibrated to assist the sedimentation process. After vibrating for about ½ hour, the excess water on the surface of the forming preform was removed with a paper towel. After vibrating for about an additional 1 to 1½ hours, the remaining surface water was removed and the silicone rubber mold was taken off the vibration table and placed into a freezer. After the residual water in the preform had frozen, the silicone rubber mold and the preform were removed from the freezer and the frozen sediment cast preform was withdrawn from the mold. The preform was placed on a bed of 90 grit (average particle diameter of about 216 μm) 38 ALUNDUM® alumina particulate material and allowed to dry in air at room temperature for about 16 hours, After drying, the sediment cast preform was transferred to a new bedding of 90 grit alumina supported by a refractory plate and placed into a resistance heated air atmosphere furnace for firing. The furnace temperature was increased from substantially room temperature to a temperature of about 1050° C. in a period of about 10 hours. After maintaining a temperature of about 1050° C. for about 2 hours, the temperature was decreased to substantially room temperature in a period of about 10 hours.

A graphite foil box measuring about 8.5 inches (216 mm) square and about 4 inches (102 mm) tall was prepared from a sheet of GRAFOIL® graphite foil (Union Carbide Company, Danbury, Conn.) and placed into a graphite boat having an interior cavity measuring about 9 inches (229 mm) square and about 4 inches (102 mm) tall. The fired sediment cast preform was then placed into the bottom of the graphite foil box. A bedding material comprising by weight about 15% Grade F-69 borosilicate glass frit (Fusion Ceramics, Inc., Carrollton, Ohio) and the balance equal proportions of 90, 220, and 500 grit E1 ALUNDUM® alumina particulate (Norton Co.) was placed into the graphite foil box around the fired sediment cast preform to a level substantially flush with the top of the preform. A thin surface layer of −100 mesh (particle diameter less than about 150 μm) magnesium powder (Hart Corporation, Tamaqua, Pa.) was sprinkled over the top surface of the preform.

A gating means comprising a graphite ring, with an inside diameter measuring about 2½ inches (64 m) and a height of about ½ inch (13 mm), was centered over an about 2½ inch (64 mm) diameter hole in an about 7 inch (178 mm) square by about 14 mil (0.36 mm) thick sheet of GRAFOIL® graphite foil. The graphite ring was then adhered to the graphite foil with a thin layer of an adhesive comprising by volume about 25 to 50% RIGIDLOCK® graphite cement (Polycarbon Corporation, Valencia, Calif.) and the balance ethyl alcohol. The joined graphite components were allowed to dry in air at room temperature for about 3 to 5 hours.

The graphite foil and ring assembly were then placed into the graphite foil box on top of the layer of −100 mesh magnesium powder with the graphite ring facing up. The inside of the graphite ring was then filled with a dry particulate mixture comprising by weight about 1%–100 mesh magnesium powder, about 1%–325 mesh magnesium powder, about 29% 90 grit 39 CRYSTOLON® green silicon carbide and the balance 54 grit (average particle diameter of about 430 μm) green silicon carbide. Additional bedding material (the above-described particulate mixture of alumina and glass frit) was then poured into the graphite box around the graphite foil and ring assembly to a height substantially flush with the top of the graphite ring but somewhat higher out towards the walls of the graphite box. An ingot of matrix metal weighing about 1736 grams and measuring about 5 inches (127 mm) square and about 1½ inches (38 mm) thick and comprising by weight about 12% silicon, about 6% magnesium, and the balance aluminum, was placed into the graphite foil box and centered over the graphite ring to form a lay-up.

The graphite boat and its contents were placed into a resistance heated controlled atmosphere furnace at room temperature. The furnace chamber was evacuated to about 30 inches (762 mm) of mercury vacuum and then backfilled with nitrogen gas. A gas flow rate of about 3 liters per minute was established. The furnace temperature was increased to about 825° C. at a rate of about 150° C. per hour. After maintaining a temperature of about 825° C. for about 20 hours, the temperature was decreased to about 700° C. at a rate of about 200° C. per hour. The flow rate of nitrogen gas was maintained at about 3 liters per minute throughout the heating cycle. At a temperature of about 700° C., the graphite boat and its contents were removed from the furnace and placed onto a water cooled aluminum chill plate. FEEDOL® No. 9 particulate hot topping material was poured onto the top of the residual molten matrix metal contained within the lay-up to cause an exothermic reaction which supplied heat to the surface of the residual molten matrix metal. An about 2 inch (51 mm) thick layer of CERABLANKET® ceramic fiber insulation (Manville Refractory Products, Denver, Colo.) was placed on top of the lay-up and across the graphite boat to further assist in directional solidification process. After the graphite boat and its contents had cooled to substantially room temperature, the lay-up was removed from the graphite boat. The bedding of alumina and glass frit material was removed from around the lay-up to reveal that at least some of the matrix metal had infiltrated the sediment cast preform to produce a metal matrix composite tile of substantially the same size and shape as that of the preform. Further inspection revealed that there was little or no infiltration of the molten matrix metal into the alumina and glass frit bedding material.

EXAMPLE 10

This Example demonstrates that the investment shell barrier concept works not only with wax investment patterns but also when the pattern comprises a cellulose based material such as basswood.

A hollow body of triangular cross-section having one open-end and containing additional structural members was assembled by gluing together about 1/16 inch (1.6 mm) thick sheets of basswood. The lengths of the triangular sides were about 4, 4, and 3 inches (102, 102 and 76 mm), respectively. The depth of the body was about 3 inches (76 mm). The interior of the triangular body was braced with three additional sheets of basswood each about 3 inches (76 mm) long and oriented such that two were parallel to the base of the triangle and the third was substantially perpendicular to the base and adjacent to the base. The basswood sheets were joined to one another with ELMER'S® wood glue (Professional Carpenters Wood Glue, Borden Company, Columbus, Ohio). Upon curing the glue in air at substantially room temperature for about 2 to 3 hours, the basswood fugitive investment pattern was then sealed with a protective coating of RED DEVIL® HI-GLOSS 70 polyurethane (Red Devil Paints and Chemicals, Division of Insilco Company, Mount Vernon, N.Y.). After drying the brushed-on polyurethane coating for about ½ hour, two additional coatings were applied, each with an approximately ½ hour drying period after the coating application. The finished basswood pattern was then joined to a Grade 5550-K. GRN. FLK. wax pattern in the shape of the desired matrix metal reservoir measuring about 3 inches (76 mm) in height, about 3 inches (76 mm) in diameter at the top and about 2 inches (51 mm) in diameter at its base where it contacted the basswood investment pattern. The basswood investment pattern was joined to the wax reservoir pattern with molten wax.

The basswood and wax pattern assembly was then coated with investment shell layers in substantially the same manner as those described in Example 8. In this Example, however, three primary investment shell coatings were applied instead of two. Furthermore, after the third secondary investment shell coating was applied, the investment shell was wrapped with a length of wire for added strength. Two additional layers of the secondary investment shell coating composition were then applied on top of the wire wrapped investment shell.

Several holes were drilled in the investment shell in strategic locations to assist in venting gases from the basswood during the subsequent flash firing. The coated basswood and wax reservoir investment pattern was then flash fired by placing said pattern into a gas heated air atmosphere furnace at a temperature of about 890° C. and holding at that temperature for about 15 minutes to burn out the basswood and the wax. The remaining investment shell was then removed from the 890° C. gas furnace and immediately placed into a resistance heated air atmosphere furnace at a temperature of about 850° C. After firing the investment shell for about 6 hours at a temperature of about 850° C. to remove the chemically bound water and to rigidize the shell, the investment shell was removed from the furnace at a temperature of about 850° C. and placed onto a room temperature refractory plate and allowed to cool.

A blend of 39 CRYSTOLON® green silicon carbide particulates comprising about 772 grams of 220 grit (average particle diameter of about 66 μm) and about 193 grams of 500 grit (average particle diameter of about 17 um) particles were placed into a dry 1.1 liter alumina ball mill containing about 2000 grams of dry about ½ inch (13 mm) diameter BURUNDUM® alumina stones. The alumina ball mill, the ball mill lid (removed from mill) and its contents were vacuum dried for about 4 hours at a temperature of about 150° C. under about 30 inches (762 mm) of mercury vacuum.

The ball mill and its contents were removed from the vacuum drier and −325 mesh (particle diameter less than 45 μm) magnesium powder (Reade Manufacturing Company, Lakehurst, N.J.) was added to the silicon carbide particulate in the ball mill to produce a filler material admixture. The lid to the ball mill was then secured and the filler material admixture was milled for about 2 hours. The ball mill lid was then removed from the alumina ball mill and the ball mill and its contents were vacuum dried a second time for at least about 4 hours at a temperature of about 150° C. under about 30 inches (762 mm) of mercury vacuum.

The vent holes in the investment shell were filled with a CARBORUNDUM® FIBERFRAX® ceramic fiber blanket. About 138 grams of the milled and dried filler material admixture was then poured into the investment shell while the shell was shaken back and forth to allow the admixture to fill in as much space as possible in the narrow walls. When all of the admixture had been poured into the investment shell, the shell was then tapped about 5 times on a hard surface to complete the packing of the admixture. Additional −50 mesh magnesium particulate material (Reade Manufacturing Company) was sprinkled evenly over the surface of the filler material admixture until a concentration of about 6 milligrams per square centimeter of filler material surface was achieved. An ingot of matrix metal weighing about 901 grams, and having substantially the same composition as the matrix metal ingot used in Example 4, was then placed onto a sling comprising several copper foil strips suspended over the magnesium particulate dusted surface of the filler material admixture. The ends of the copper strips were wrapped over the walls of the investment shell. The copper foil sling served to prevent the matrix metal from contacting the filler material admixture until the matrix metal was in a molten state. A PERMA FOIL graphite foil sheet measuring about 4 inches (102 mm) square was placed over the opening at the top of the investment shell.

The investment shell and its contents were then placed into a stainless steel can measuring about 10 inches (254 mm) wide by about 10 inches (254 mm) long by about 10 inches (254 mm) tall. About 7 grams of Grade RMC-3 magnesium turnings and about 12 grams of TI-LOY 97 titanium sponge were placed into the stainless steel can outside of the investment shell. The magnesium turnings and the titanium sponge were utilized as oxygen-getters. Two sheets of copper foil each measuring about 14 inches (356 mm) by about 16 inches (406 mm) by about 6 mils (0.15 mm) thick were placed over the opening of the stainless steel can. Those portions of the sheets extending over the sides of the can were folded down tightly against the sides of the can to form an isolated chamber.

The stainless steel can and its contents were placed into a resistance heated air atmosphere furnace. A nitrogen gas flow rate of about 15 liters per minute was provided to the interior of the can through a feed tube which extended through one side of the can. The furnace was then heated from substantially room temperature to a temperature of about 790° C. at a rate of about 400° C. per hour. After maintaining a temperature of about 790° C. for about 3½ hours, the nitrogen gas feed tube was disconnected from the stainless steel can and the can and its contents were removed from the furnace and placed onto a water cooled copper chill plate. The copper and graphite foil sheets were removed from the stainless steel can and the investment shell, respectively, and FEEDOL ® No. 9 hot topping particulate mixture was poured onto the top of the residual molten matrix metal contained within the investment shell to cause an exothermic reaction which provided heat to the surface of the residual molten matrix metal and thereby assisted in the directional solidification of the molten matrix metal contained within the investment shell.

After the stainless steel can and its contents had cooled to room temperature, the investment shell and its contents were removed from the stainless steel can. The investment shell was removed to reveal that at least some of the matrix metal had infiltrated the filler material admixture to form a metal matrix composite. Further inspection revealed that the formed metal matrix composite body was of substantially the same size and shape as the mold cavity defined by the investment shell, which in turn was defined by the shape of the basswood and wax patterns, respectively.

What is claimed is:

1. A method for making a metal matrix composite, comprising:
    (a) providing a permeable mass comprising at least one of a body of substantially non-reactive filler and a preform;
    (b) contacting said permeable mass with a reactive barrier means so as to define at least a portion of at least one surface of said permeable mass; and
    (c) spontaneously infiltrating without the requirement of an internally created vacuum within said permeable mass, at leat a protion of said permeable mass with a molten matrix metal up to at least a portion of said eactive barrier means to form a metal matrix composite having at least a portion of at leat one surface established by said reactive barrier means.

2. The method of claim 1, wherein said reactive barrier reacts with at least one component comprising the matrix metal.

3. The method of claim 1, wherein said barrier comprises at least one material selected from the group consisting of alumina particulate and low-volatile organic compounds.

4. The method of claim 1, wherein said matrix metal comprises aluminum.

5. The method of claim 1, wherein said filler comprises at leat one material selected from the group consisting of oxides, carbides, borides and nitrides.

6. The method of claim 1, wherein said filler comprises a filler substrate having a ceramic coating, which coating is selected from the group consisting of oxides, carbides, borides, nitrides and mixtures thereof.

7. The method of claim 1, wherein said filler comprises at least one material selected from the group consisting of powders, flakes, plateletes, microspheres, whiskers, bubbles, fibers, particulates, fiber mats, chopped fibers, spheres, pellets, tubules and refractory cloths.

8. The method of claim 1, wherein the filler comprises at least one ceramic material.

9. The method of claim 1, wherein sthe filler is of limited solubility in the molten matrix metal.

10. The method of claim 1, wherein said reactive barrier means comprises a material selected from the group consisting of calcium carbonate, aluminum phosphate, colloidal silica and boric oxide.

11. A method of making a metal matrix composite, comprising:

contacting a body of at least one permeable mass of at least one of a filler and a preform with a reactive barrier means, said reactive barrier means defining at least a portion of at least one surface of said permeable mass;

infiltrating at least a portion of said permeable mass with a molten matrix metal, at least one of the matrix metal and permeable mass being in the presence of at least one of an infiltration enhancer precursor, and infiltration enhancer, and an infiltrating, wherein said infiltrating occurs without the requirement of an internally created vacuum within said permeable mass, atmosphere for at least a portion of the period of infiltration;

continuing said infiltration until said molten matrix metal contacts at least a portion of said reactive barrier means, thereby terminating the infiltration of said molten matrix metal at said at least one surface boundary; and cooling said molten matrix metal within said permeable mass to a metal matrix composite body, said metal matrix composite body having at leat a portion of at leat one surface defined by said reactive barrier means.

12. The method of claim 11, wherein said reactive barrier reacts with at least one of at least one component comprising the matrix metal, the infiltration enhancer precursor and the infiltration enhancer.

13. The method of claim 11, wherein said infiltrating atmosphere comprises at least 50% by volume nitrogen and a remainder comprising at least one gas selected from the group consisting of argon and hydrogen.

14. The method of claim 13, wherein said infiltrating atmosphere comprises substantially pure nitrogen.

15. The method of claim 11, wherein said at least one of said infiltration enhancer precursor and infiltration enhancer is provided in both of said matrix metal and said filler material.

16. The method of claim 11, wherein said infiltration enhancer is formed by reacting said infiltration enhancer precursor with at least one species selected from the group consisting of the infiltrating atmosphere, the filler and the matrix metal.

17. The method of claim 16, wherein during infiltration, the infiltration enhancer precursor volatilizes.

18. The method of claim 17, wherein the volatilized infiltration enhancer precursor reacts to form a reaction produce in at least a portion of the filler.

19. The method of claim 18, wherein said reaction product is at least partially reducible by said molten matrix metal.

20. The method of claim 11, wherein the infiltration enhancer precursor comprises a material selected from the group consisting of magnesium, strontium and calcium.

21. The method of claim 11, wherein the matrix metal comprises aluminum, the infiltration enhancer precursor comprises magnesium and the infiltrating atmosphere comprises nitrogen.

22. The method of claim 11, wherein said infiltration enhancer precursor is alloyed in said matrix metal.

23. The method of claim 11, wherein the filler is of limited solubility in the molten matrix metal.

24. A method for making a metal matrix composite, comprising:
    (a) providing a permeable mass comprising at least one of a body of substantially non-reactive filler and a preform;

(b) contacting said permeable mass with barrier means comprising at least one material selected from the group consisting of calcium carbonate, aluminum phosphate, colloidal silica, boric oxide and alumina so as to define at least a portion of at least one surface of said permeable mass; and (c) spontaneously infiltrating at least a protion of said permeable mass with a molten matrix metal up to at least a portion of said barrier means to form a metal matrix composite having at least a portion of at least one surface established by said reactive barrier means.

25. The method of claim 12, wherein the reaction forms a compound which interferes with further infiltration of said molten matrix metal.

26. The method of claim 12, wherein the reaction removes at least one of said infiltration enhancer and said infiltration enhancer precursor, which removal interferes with further infiltration of said molten matrix metal.

27. The method of claim 24, wherein said barrier means functions partially as a reactive barrier and partially as a physical barrier.

28. The method of claim 24, wherein said barrier means comprises finely ground particulate.

29. The method of claim 28, wherein said finely ground particulate material functions as a barrier when said molten matrix metal spontaneously infiltrates said material at a slower rate than said matrix metal infiltrates said permeable mass.

* * * * *